United States Patent
Kleinsasser

[19]

[11] Patent Number: 5,967,083
[45] Date of Patent: Oct. 19, 1999

[54] ADJUSTABLE FEEDER FOR ANIMALS

[75] Inventor: Jonathan Kleinsasser, Ste. Agathe, Canada

[73] Assignee: Crystal Spring Colony Farm Ltd., Ste. Agathe, Canada

[21] Appl. No.: 09/073,216

[22] Filed: May 6, 1998

Related U.S. Application Data

[63] Continuation-in-part of application No. 08/898,154, Jul. 22, 1997, abandoned.

[51] Int. Cl.$^6$ .................................................. A01K 5/01
[52] U.S. Cl. ................................. 119/53; 119/52.4
[58] Field of Search ..................... 119/52.4, 52.3, 119/54, 52.1, 53, 53.5, 61, 75

[56] References Cited

U.S. PATENT DOCUMENTS

| | | | |
|---|---|---|---|
| 1,807,633 | 6/1931 | Miller . | |
| 2,543,916 | 3/1951 | Lewis | 119/53.5 |
| 2,959,154 | 11/1960 | Adams | 119/52 |
| 3,951,107 | 4/1976 | Doty | 119/52 |
| 4,147,132 | 4/1979 | Gilst | 119/53 |
| 4,444,151 | 4/1984 | Bohlmann | 119/53.5 |
| 5,603,285 | 2/1997 | Kleinsasser | 119/53 |
| 5,640,926 | 6/1997 | Kleinsasser | 119/53 |

FOREIGN PATENT DOCUMENTS 87 15 887  4/1988  Germany ................. A01K 5/00

*Primary Examiner*—Michael J. Carone
*Assistant Examiner*—Yvonne R. Abbott
*Attorney, Agent, or Firm*—Adrian D. Battison; Murray E. Thrift

[57] ABSTRACT

A two sided feeder for feeding animals while the animals grow from a first smaller size to a second larger size comprises a trough having two opposed outwardly inclined front walls over which the animals can reach for taking feed from the trough and a feed hopper for discharging feed downwardly into the trough. The height of each front wall is adjustable by a hinged or removable supplementary portion to accommodate the different size animals. A shelf is provided above the trough onto which the feed is deposited. The height of the shelf is also adjustable. The hopper includes two vertical side walls defining a lower neck each having a lowermost edge adjacent the shelf for controlling deposit of material onto the shelf so that it remains on the shelf unless moved to the trough by the animal. The neck is supplemented by a clamped insert portion when the shelf is moved to its lower height.

20 Claims, 8 Drawing Sheets

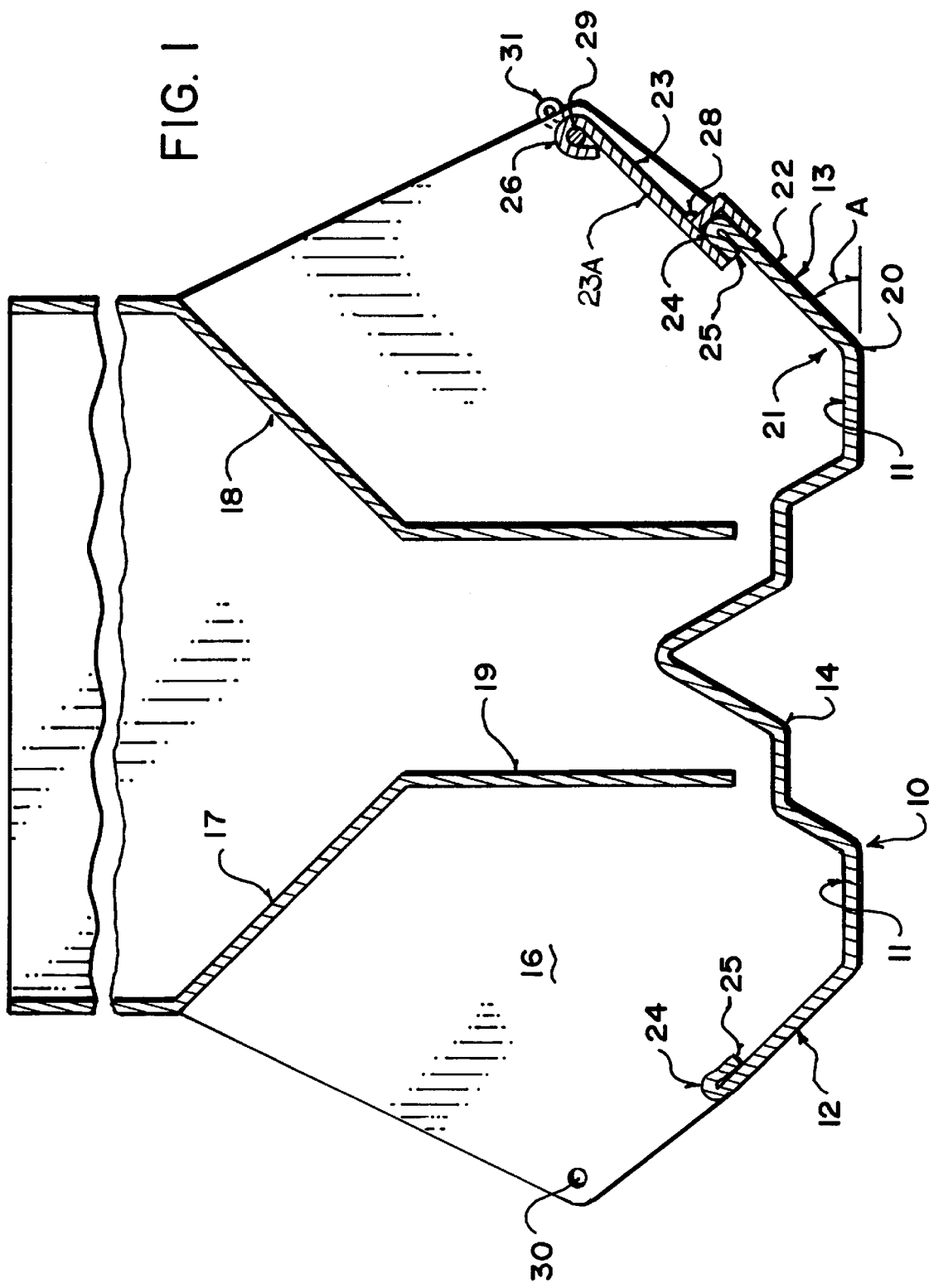

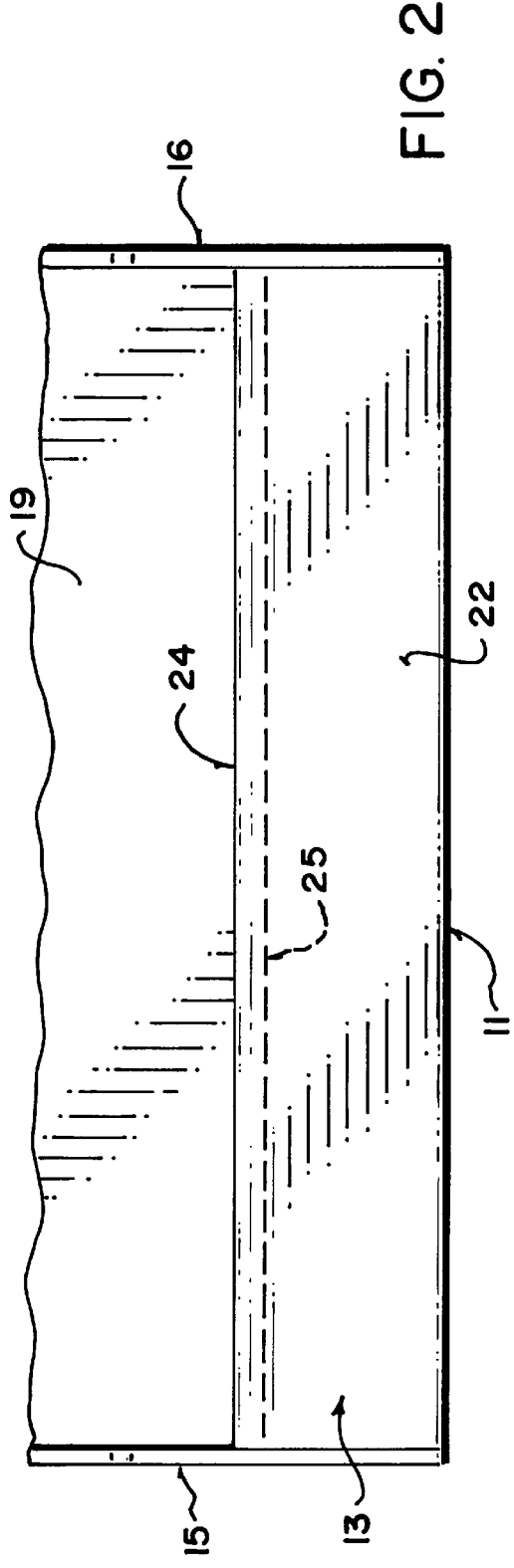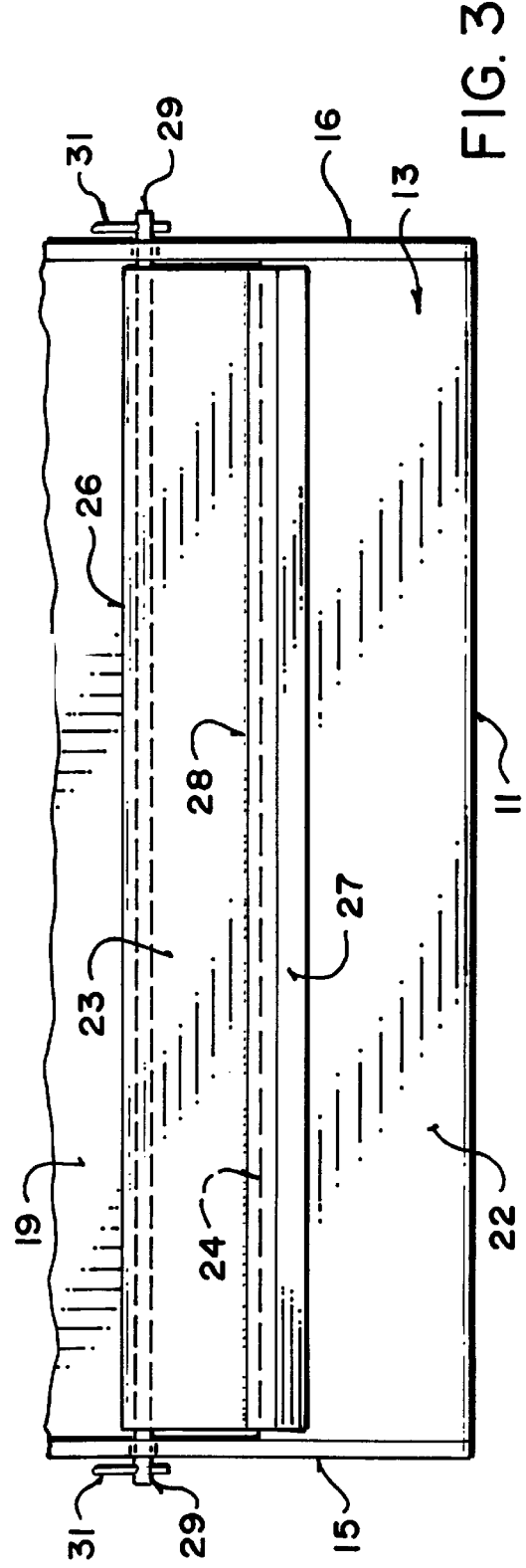

ADJUSTABLE FEEDER FOR ANIMALS

This application is a continuation in part of application Ser. No. 08/898,154 filed Jul. 22$^{nd}$ 1997 now abandoned.

This invention relates to a feeder for animals which can be adjusted to accommodate animals of different size as the animals grow from a smaller size to a larger size.

BACKGROUND OF THE INVENTION

In U.S. Pat. No. 5,640,926 of the present inventor issued Jun. 24, 1997 is disclosed a feeder for animals, primarily pigs, which includes a shelf on to which feed is deposited from a hopper, the shelf being located above a trough into which feed can fall from the shelf. In this feeder, the height of the shelf from the trough is adjustable so as to accommodate a change in size of the animals from a smaller size up to a larger size as the animals grow.

In U.S. Pat. No. 2,543,916 of Lewis issued Mar. 6, 1951 there is shown a feeder for poultry which has a hopper discharging directly into a trough. The trough is designed so that its width can be increased. In addition the trough has vertical side walls each of which carries a tubular member at its upper edge and defining a top of the respective side wall. The height of the tubular member can be adjusted by releasing a pair of wing-nuts and sliding the tubular member vertically to an adjusted position. The top edge of the tubular member thus defines the height of the side wall. A bottom surface of the tubular member overhangs the base of the trough. It is believed, although not clearly stated, that the height adjustment of the side walls is provided in order to accommodate vertical movement of the side walls of the hopper so that more or less feed can be provided within the trough. Thus as the side wall of the hopper are moved vertically upwardly to provide more feed in the trough, so the side walls of the trough are raised to accommodate that increased amount of feed. This arrangement may be suitable for poultry but is unsatisfactory for animals such as pigs in that the shape of the side walls will interfere with the animals extracting the feed from the trough thus causing some stale feed to be left underneath the side walls.

SUMMARY OF THE INVENTION

It is one object of the present invention to provide an improved feeder for animals which allows adjustment of the height of the lowermost edge of the hopper relative to the shelf so that when the shelf height is adjusted, the height of the lowermost edge can also be quickly and effectively adjusted.

According to a first aspect of the invention there is provided a feeder for feeding animals while the animals grow from a first smaller size to a second larger size comprising:

a trough having a base and a side wall over which the animals can reach for taking feed from the trough;

a shelf mounted above the base of the trough and arranged at a height such that the animals can take feed from the shelf while reaching over the side wall and such that feed falling from the shelf is collected in the trough;

the shelf being adjustable for raising and lowering the shelf whereby the height of the shelf from the base of the trough can be adjusted to at least two different heights including a first lower height to accommodate said animals at the first smaller size and including a second higher height to accommodate said animals at the second larger size;

a feed hopper positioned above the shelf for depositing feed onto the shelf, the hopper having an inclined hopper wall and a substantially vertical lower wall portion at a bottom of the inclined wall, the lower wall portion having a lowermost edge extending along the shelf and arranged, with the shelf at the higher height, at a distance from the shelf which distance acts to control an amount of feed discharged from the hopper onto the shelf, and which distance together with the relative locations of the shelf and the lowermost edge of the lower wall portion acts to maintain the feed discharged on the shelf unless moved from the shelf by the animal;

and a separate insert member insertable into and removable from the hopper, the insert member having a supplementary wall portion arranged such that, when inserted with the shelf at the lower height, the supplementary wall portion is located along the lower wall portion and projects downwardly therefrom to define a lowermost edge of the supplementary wall portion below the lowermost edge of the lower wall portion and at a distance from the shelf which distance acts to control an amount of feed discharged from the hopper onto the shelf, and which distance together with the relative locations of the shelf and the lowermost edge of the supplementary wall portion acts to maintain the feed discharged on the shelf unless moved from the shelf by the animal.

According to a second aspect of the invention there is provided a feeder for feeding animals while the animals grow from a first smaller size to a second larger size comprising:

a trough having a base, a first longitudinal side wall and a second longitudinal side wall parallel to the first side wall over both of which the animals can reach for taking feed from opposed sides of the trough;

a shelf mounted above the base of the trough and arranged at a height such that the animals can take feed from the shelf while reaching over the side wall and such that feed falling from the shelf is collected in the trough;

the shelf having two side edges each presented toward a respective side of the trough;

the shelf being adjustable for raising and lowering the shelf whereby the height of the shelf from the base of the trough can be adjusted to at least two different heights including a first lower height to accommodate said animals at the first smaller size and including a second higher height to accommodate said animals at the second larger size;

a feed hopper positioned above the shelf for depositing feed onto the shelf, the hopper having two inclined side walls converging inwardly and downwardly to a neck portion defined by two substantially parallel, vertical lower wall portions, the lower wall portions each having a lowermost edge extending along the shelf and arranged, with the shelf at the higher height, at a distance from the shelf which distance acts to control an amount of feed discharged from the hopper onto the shelf, and which distance together with the relative locations of the shelf and the lowermost edge of the lower wall portion acts to maintain the feed discharged on the shelf unless moved from the shelf by the animal;

and a separate insert member insertable into and removable from the neck portion of the hopper, the insert member having two parallel spaced supplementary wall portions arranged such that, when inserted into the neck portion with the shelf at the lower height, the supplementary wall portions are located along respective ones of the lower wall portions and project downwardly therefrom to define a lowermost edge of each of the supplementary wall portion below the lowermost edge of the respective lower wall portion and at a distance from the shelf which distance acts to control an amount of feed discharged from the hopper onto the shelf, and which distance together with the relative locations of the shelf and the lowermost edge of the supplementary wall portion acts to maintain the feed discharged on the shelf unless moved from the shelf by the animal.

Preferably there is provided a clamping member operable to locate the insert member in the neck portion of the hopper.

Preferably the supplementary wall portions are connected at a fixed spacing by spacer members arranged to allow the passage of feed through the neck portion to the shelf.

Preferably the clamping member is manually operable.

Preferably the clamping member provides a handle extending upwardly from the insert member within the hopper for manually grasping the insert member for removal from the neck portion of the hopper.

Preferably the clamping member includes a generally horizontal clamp bar rotatable about a substantially vertical axis such that each end of the clamp bar extends through an opening in a respective one of the supplemental wall portions into engagement with a respective one of the lower wall portions.

Preferably each lower wall portion includes a generally horizontal groove therein and wherein the end of the clamp bar engages into the groove to hold the insert against vertical movement relative to the lower wall portion.

Preferably each supplemental wall portion includes an inclined flange portion for engaging an edge portion of a respective one of the inclined walls at the respective lower wall portion.

Preferably the supplementary wall portions are connected at a fixed spacing by at least two spacer members arranged to allow the passage of feed through the neck portion to the shelf and wherein there is provided two generally horizontal clamp bars each rotatably mounted on a respective one of the spacer members for rotation about a substantially vertical axis such that each end of the clamp bar extends through an opening in a respective one of the supplemental wall portions into engagement with a respective one of the lower wall portions.

Preferably each clamp bar carries a handle extending upwardly therefrom within the hopper for manually grasping the insert member for removal from the neck portion of the hopper.

BRIEF DESCRIPTION OF THE DRAWINGS

Embodiments of the invention will now be described in conjunction with the accompanying drawings in which:

FIG. 1 is a vertical cross sectional view through a first embodiment of feeder according to the present invention.

FIG. 2 is a side elevational view of the feeder of FIG. 1 with the side wall in its lower position.

FIG. 3 is a side elevational view similar of FIG. 2 showing the side wall in the raised position.

DETAILED DESCRIPTION

The embodiment as shown in FIGS. 1, 2 and 3 includes a dry feeder of a type in which a hopper discharges feed directly on to a base wall of the trough so the animal can take feed in dry conditions from that trough. Dry feeders of this general type are known.

Figure 8:
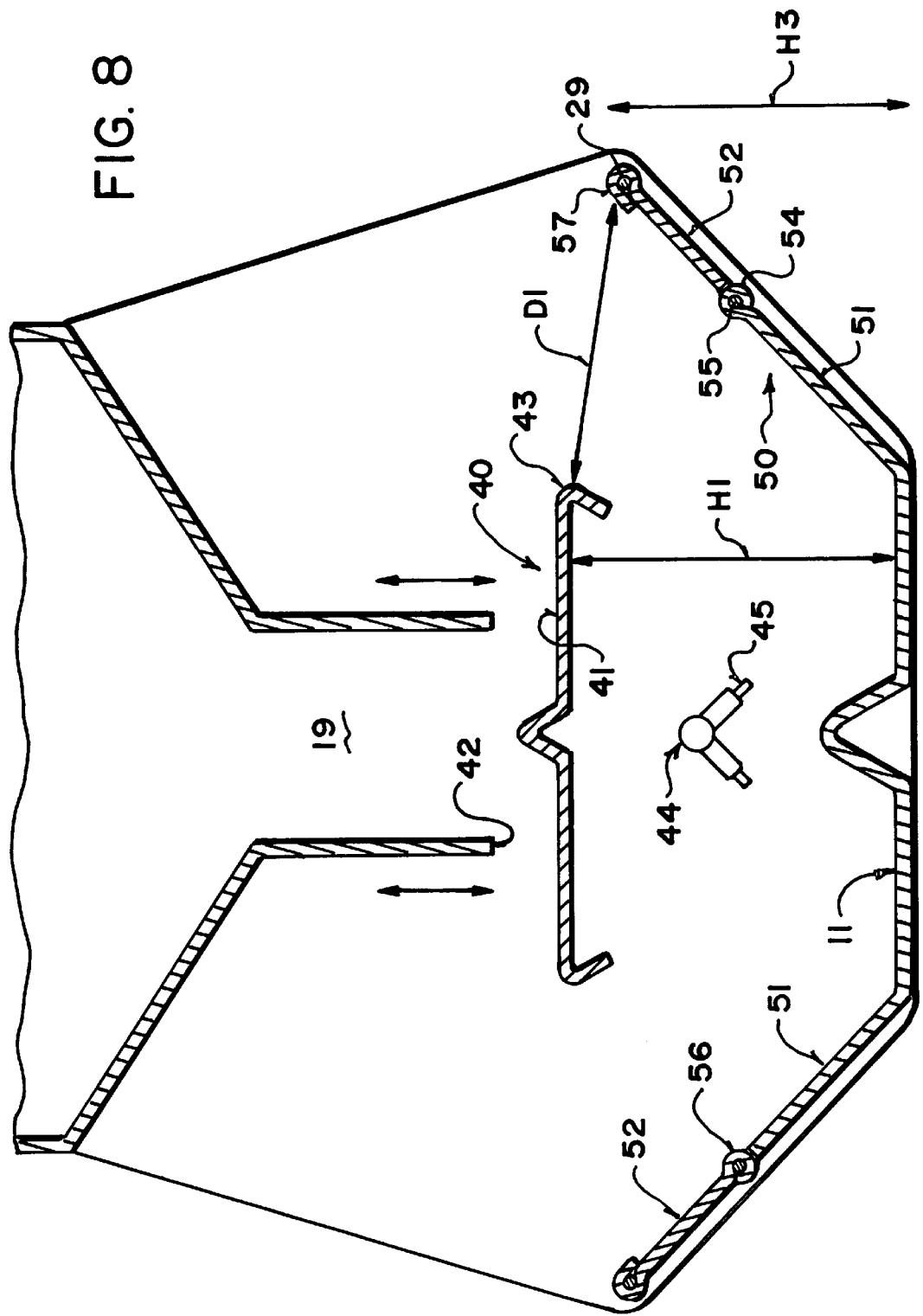
FIG. 8 is a vertical cross sectional view through a third embodiment according to the present invention.
Figure 9:
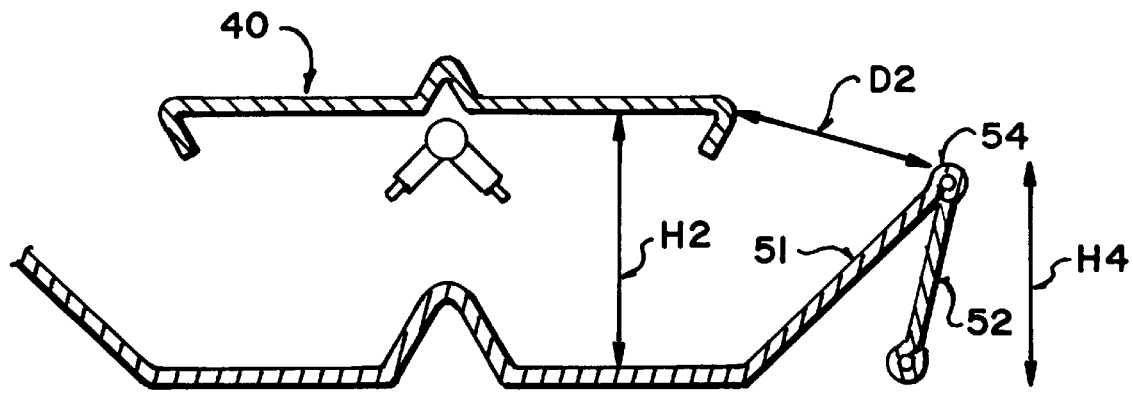
FIG. 9 is a cross sectional view of one part only of the embodiment of FIG. 8 showing the side wall in the lowered position.
Figure 10:
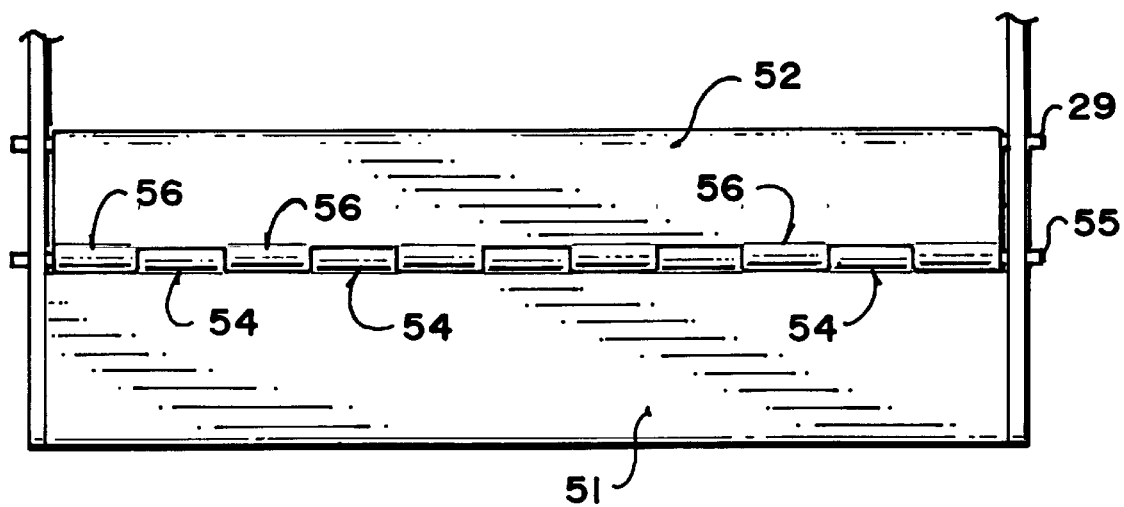
FIG. 10 is a side elevation view of the embodiment of FIG. 8 showing the side wall in the raised position.

The embodiments shown in FIGS. 4, 5, 6 and 7 and in FIGS. 8, 9 and 10 are of the type shown a wet and dry feeder or shelf-type feeder in which the feed is deposited onto a shelf positioned above the trough so that the feed is available in dry condition on the shelf accessible by the animal and can be move by the animal to the trough for mixing with water for taking in wet condition. This type of feeder is also well known.

In FIG. 1, the feeder comprises a trough generally indicated at 10 including a horizontal base 11 and a pair of walls 12 and 13. In the embodiments shown the feeders are of the double sided type in that the animals can access the feeder from both sides so the feeder is symmetrical about a vertical central plane. Other types of feeders are single sided so that the effective parts of the device will comprise simply the base 11 and a front wall adjacent the animal. From the animal's perspective, the walls 12 and 13 both comprise front walls in that the animal will move toward the feeder and will access the wall at the front of the trough for reaching over the wall to access the feed within the trough.

The base 11 includes a raised central section 14 on to which the feed is deposited. The central section holds the discharge point of the feed material away from the lower most point of the trough thus keeping the discharge point out of any moisture.

The ends of the trough are closed by gable end walls 15 and 16 which stand upwardly in parallel vertical planes defining ends of the feeder. The hopper for the feeder is defined by a pair of generally upstanding walls 17 and 18 extending longitudinally of the feeder between the gable end walls 15 and 16. A wider upper part of the walls 17 and 18 defines a generally rectangular hopper section which converges downwardly and inwardly to a throat section 19 above the raised center section 14 for discharging the feed material from the hopper downwardly into the trough.

The above generally described type of feeder is well known and the modification to its present relates concerns the front walls 12 and 13. Thus each of the front walls is connected to a front edge 20 of the base and is inclined upwardly and forwardly there from at an angle A relative to the horizontal base wall 11.

The angle A is less than 90 degrees in order that the area inside the front edge 20 as indicated generally at 21 defines an obtuse angle allowing the animal to reach into that area and extract feed from the area without leaving feed materials in an otherwise sharp corner.

The angle A is therefore preferably of the order of 30 degrees and is generally less than 45 degrees to provide the required effect allowing the animal to access the feed.

The front wall 13 is formed in two portions including a lower portion 22 and an upper portion 23. The lower portion is directly and rigidly connected to or integral with the base 11 and is welded to the gable walls 15 and 16. The lower portion includes a lip 24 formed by turning the upper edge of the portion inwardly and downwardly. This provides strength for the upper edge and avoids a raw edge which could damage the mouth of the animal. Thus the edge 25 of the material forming the lower portion is turned inwardly so as to lie along an inside surface of the lower portion 22. This edge 25 inhibits material from being rooted out over the lip 24.

The upper portion 23 includes a generally planar body 23A and an upper lip 26 similar to the lip 24. On the outside surface of the planar body 23A is formed a channel portion 27 attached by a weld line 28 and extending outwardly and then parallel to the portion 25 to define a downwardly facing channel receiving the lip 24.

A rod 29 extends through a hollow rounded interior of the lip 26 and through holes 30 in the gable ends 15 and 16 to affix the upper portion 23 to the feeder. The rod is fixed place by split pins 31 passing through holes in the rod outside the gable ends.

On the left hand side of FIG. 1 and in FIG. 2, the upper portion 23 in removed so that the lip 24 defines the upper edge the front wall 12.

In FIG. 3 and on the right hand side of FIG. 1 the upper portion 23 is replaced on to the lower portion of the front wall so as to stand upwardly and outwardly therefrom so as to raise the upper edge of the front wall to the lip 26. The upper portion is fixed in place when attached by the engagement of the channel portion 27 with the lip 24 and by the rod 29. In this position the planar portion 23A follows substantially the plane of the lower portion 22 so that the side wall lies in a common plane inclined at the angle A to the base. It will be appreciated that the amount of deviation of a plane of the upper portion from the plane of the lower portion as shown in FIG. 1 is exaggerated for convenience of illustration and in practice the elements will remain substantially co-planar without any significant step therebetween.

In the lower position of this front wall, therefore, the feeder can accommodate small size animals such as weanlings at a very young age which can reach over the lip 24 to reach the feed in the base of the trough.

As the animals grow to a larger size, the upper portion 23 is removed from a storage position and replaced on the feeder so as to remain in fixed position on the feeder thus raising the upper edge of the front wall to the lip 26 and accommodating larger animals which can therefore reach over the lip 26 for engaging the feed.

In the lower position, the smaller animals are not inhibited from feeding and generally can access the feed without climbing into the feeder. In the raised position the side wall larger size animals are prevented from rooting the feed out of the feeder that is lost over the front wall of the feeder.

As an alternative to the rod 29 and the pins 31, a further arrangement (not shown) can use a rod which has a head on one end and a threaded section at the opposed end with a nut on the threaded section clamping the rod in place through the gable end plates. A yet further alternative includes threaded sleeves received in the lip 26 at the ends of the lip which receive respective bolts clamping the respective gable end wall to the adjacent end of the lip 26.

Turning now to the embodiment shown in FIGS. 8, 9 and 10, this is modified in that it includes a shelf 40 so as to form a shelf-type feeder. In this embodiment, the throat section 19 of the hopper discharges onto an upper surface 41 of the shelf arranged so that the feed material remains on the shelf controlled by a lowermost edge 32 of the hopper making the feed accessible on the shelf to the animal standing in front of the front wall of the feeder. The animal can however brush the feed over a front edge 43 of the shelf into the trough for taking the feed mixed with water from a water supply 44 including animal actuated nipples 45.

In this embodiment the shelf 40 and the lowermost edge 42 of the hopper are movable vertically from a raised position as shown in FIG. 8 to a lowered position as shown in FIG. 9. The actuating mechanism for effecting the movement of these elements is omitted for convenience of illustration from this application but is available in the detail described in U.S. Pat. No. 5,640,926 of the present inventor, the description of which is incorporated herein by reference.

This embodiment is further modified in that the front wall generally indicated at 50 includes a lower portion 51 and an upper portion 52 as previously described, but in this embodiment the upper portion is connected at its lower edge to the upper edge of the lower portion by a piano hinge 53 extending along the full extent of the junction therebetween. Thus the piano hinge comprises a plurality of hinge portions 54 formed by bending an upper edge of the lower portion 51 around a hinge rod 55 together a plurality of hinge portions 56 formed at the lower edge of the upper portion 52.

Figure 6:
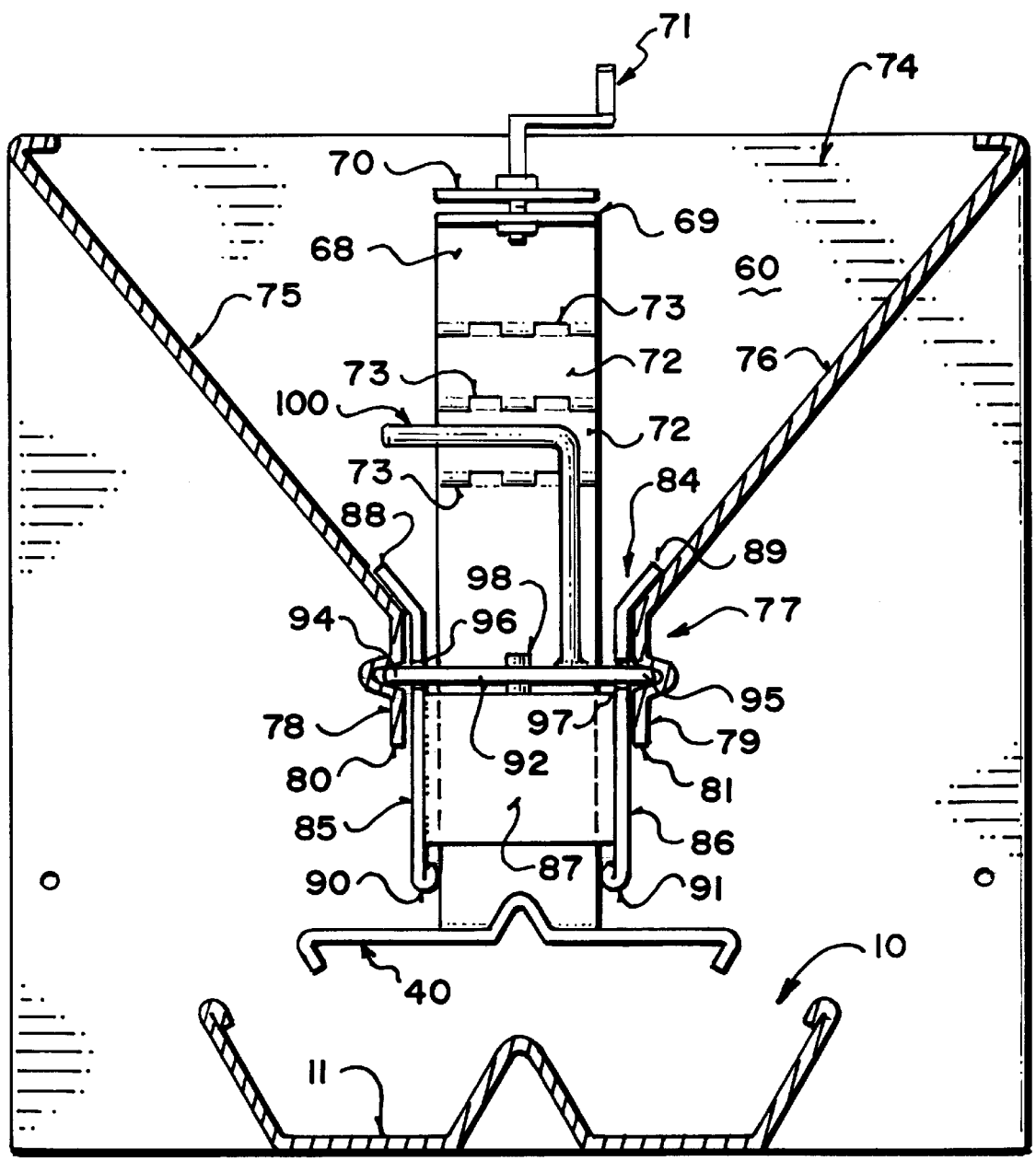
FIG. 6 is a cross-sectional view of the feeder of FIG. 4 with the side wall in its lower position, the shelf in the lower position and the neck insert portion inserted.
Figure 7:
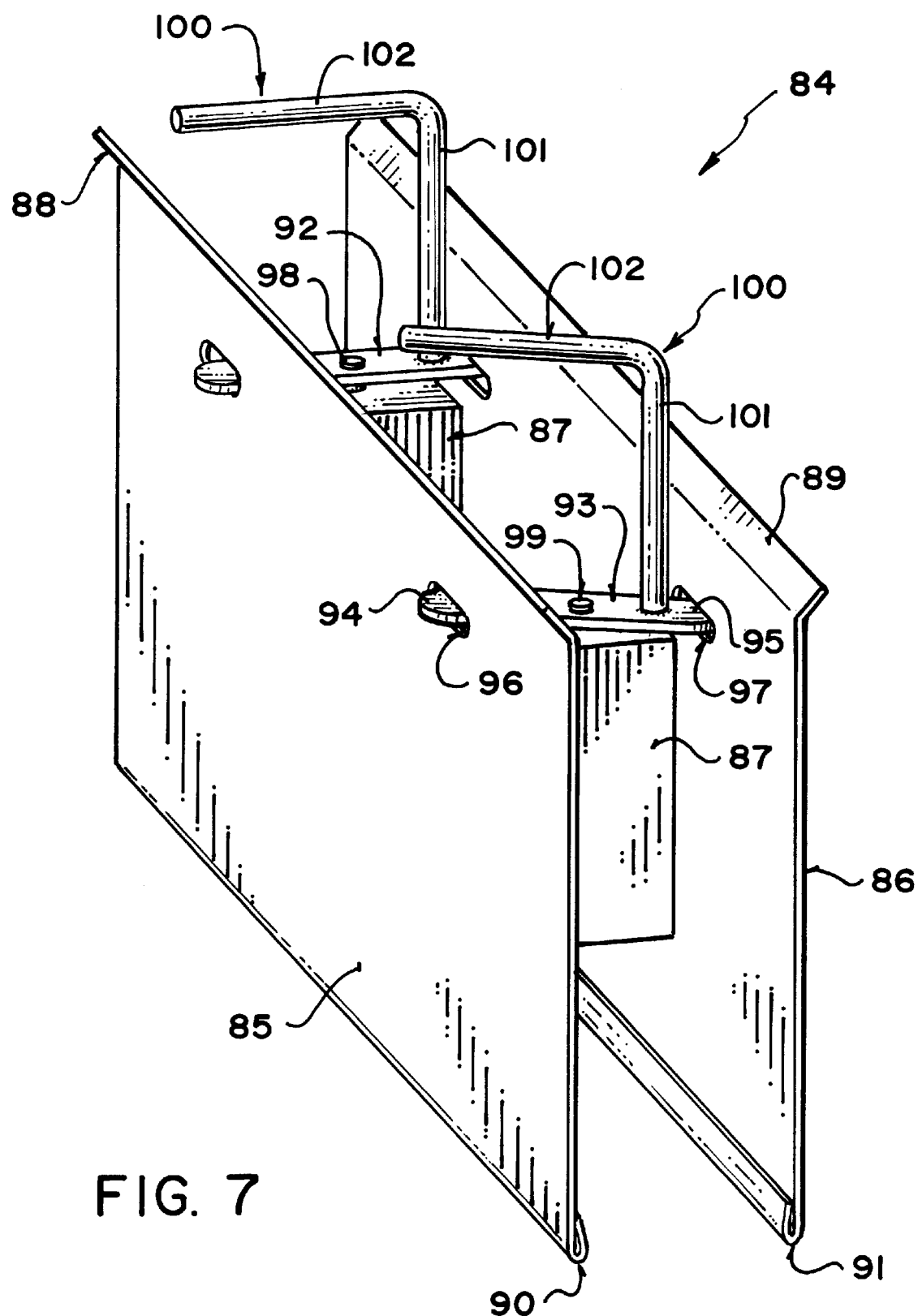
FIG. 7 is an isometric view of the neck insert portion of the feeder of FIGS. 4 and 6.

In this embodiment the hinge portions 54 and 56 form an effectively cylindrical body defining an upper edge of the lower portion and replacing the lip 24 of the embodiment of FIG. 1. In the lower position at the front wall, therefore, as shown in FIG. 6, the upper edge of the front wall is defined by the portions 54 and 56 and the upper portion 52 is moved to a position tucked underneath the outer surface of the lower portion 51. In the raised position of the front wall, the upper portion 52 is co-planar with the lower portion 51 and the upper lip 57 of the upper portion co-operates with the rod 29 as previously described.

It will be noted that the shelf moves from the raised position at a height H1 from the base 11 of the trough to a lowered position at a height H2 from the base of the trough as shown in FIG. 9.

Figure 4:
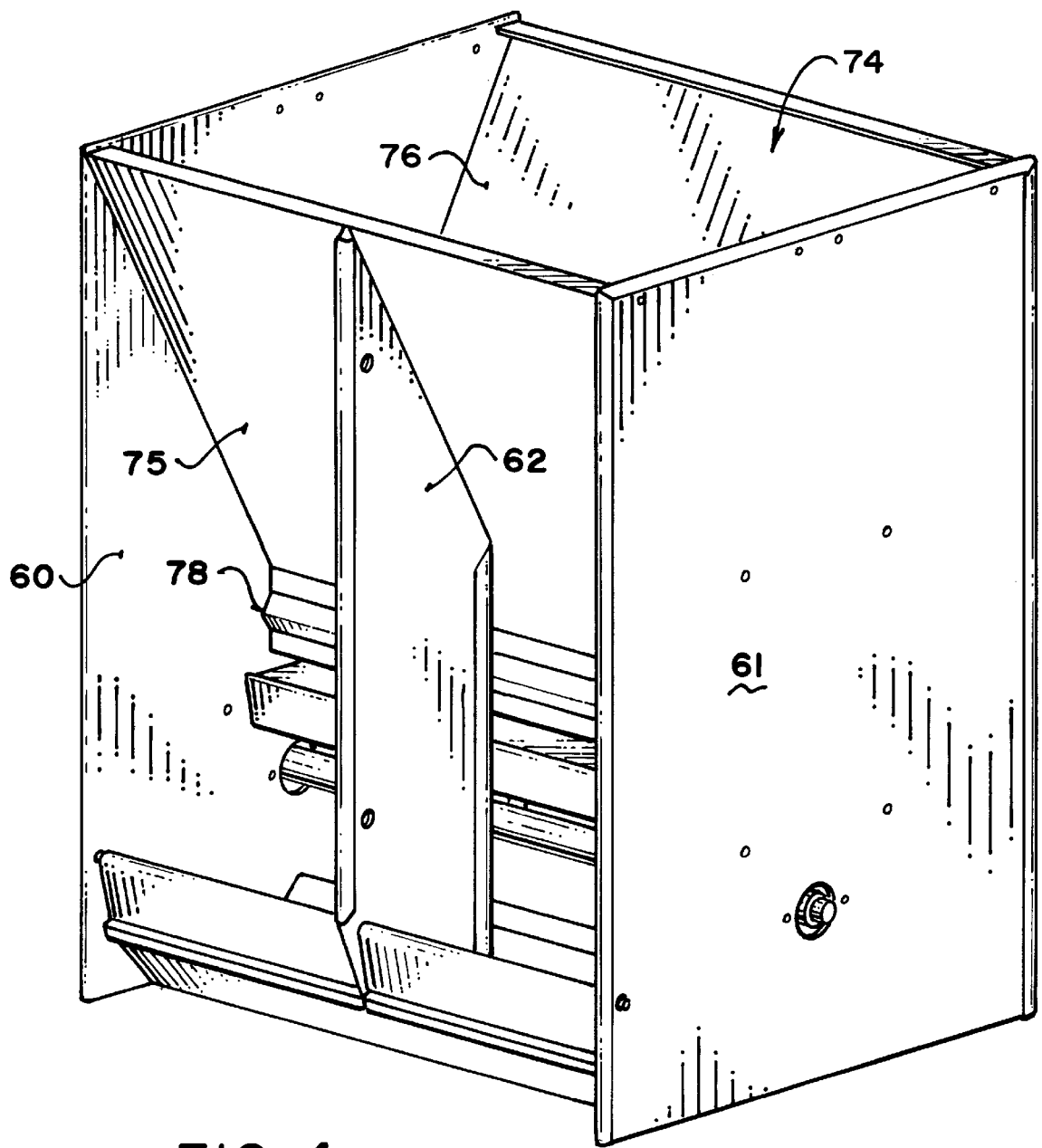
FIG. 4 is an isometric view of a second embodiment of feeder according to the present invention.

In addition the front wall of the trough moves from a raised height H3 as shown in FIG. 4 to a low height H4 as shown in FIG. 9.

As the front wall is inclined upwardly and outwardly as previously described, the adjustment of the height also changes the distance from the upper edge of the side wall to the shelf from a distance D1 as shown in FIG. 8 to a significantly smaller distance D2 as shown in FIG. 9.

The feeder therefore as shown in FIG. 9 is accessible by the animal in the small size such as a weanling of seven to ten days and is also usable when adjusted to the raised height as shown in FIG. 8 by the animal up to market weight of the order of two hundred and twenty pounds. In practice for pigs, therefore, the height H4 is of the order of three inches and the height H3 is of the order of six to seven inches. The amount of adjustment in the height of the front wall is therefore greater than 1.5 inches and preferably greater than 3 inches to allow sufficient adjustment to accommodate the animals at their widely differing sizes.

In the embodiment shown in FIGS. 4, 5, 6 and 7 is shown an alternative arrangement of the side wall which can be used with the dry feeder of FIG. 1 or the shelf feeder of FIG.

8 with a flat bottom trough and a front wall formed in two pieces as described above. In this arrangement, the adjustment portion is inclined at an angle A1 which is shallower than the angle of the lower portion A2, the latter being larger than the angle A so that the lip 24A is moved inwardly relative to the lip 24 (FIG. 1) thus locating the smaller pig closer to the feed while the larger pig is moved outwardly to the lip 26A relative to its position at the lip 26 (FIG. 1).

Turning now to the embodiments shown in FIGS. 4 through 7, there is shown a two sided feeder having a trough 10 substantially as previously described and the shelf 40 substantially as previously described. These elements are mounted longitudinally between two end walls 60 and 61 of the feeder. The end walls are rectangular so that the bottom edge projects outwardly beyond the trough. Between the end walls is provided a divider wall 62 which is parallel to the end walls and has an inclined upper edge 63 along the outside of the hopper, an outer edge 64 which is vertical and aligned with the edges of the end plates, an inside edge 65 adjacent the shelf and a bottom edge 66 at the trough and dividing the extension portion of the side wall into two parts as best shown in FIG. 4.

Figure 5:
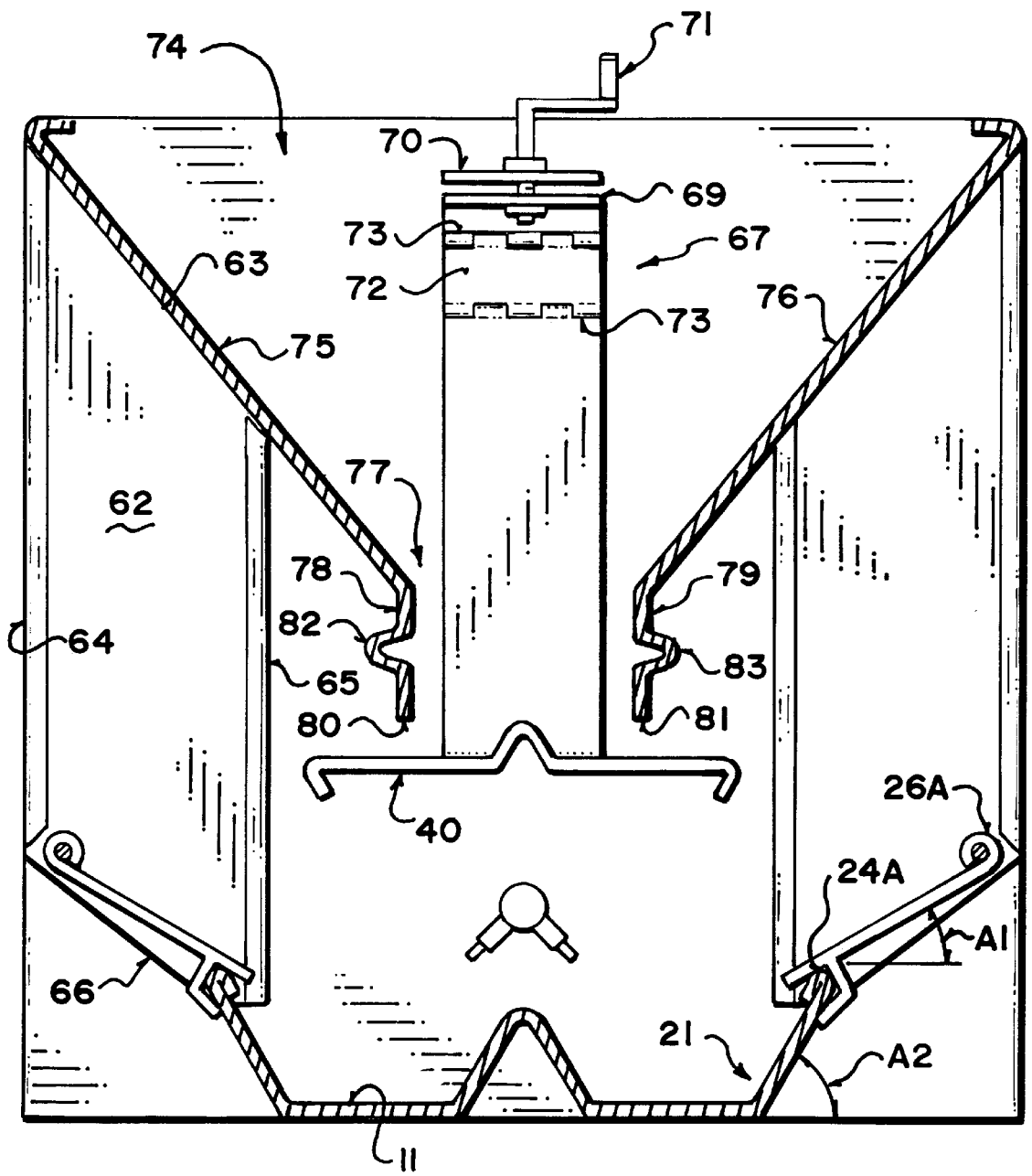
FIG. 5 is a cross-sectional view of the feeder of FIG. 4 with the side wall in its extended or raised position, the shelf in the raised position and the neck insert portion removed.

In this embodiment, the technique for adjusting the height of the shelf 40 between the raised position shown in FIG. 5 and the lowered position shown in FIG. 6 is generally indicated at 67. This comprises a pair of straps 68 arranged at the end walls 60 and 61, only one of which is visible as shown in FIGS. 5 and 6 but the other of which is identical and arranged at the opposite end wall. The strap 68 includes an upper flange 69 which is horizontal and its height is adjustable relative to a fixed flange 70 by a manually actuable screw 71. The screw 71 thus adjusts with fine adjustment the height of the shelf relative to the lower most edge of the hopper so as to adjust the amount of feed falling onto the shelf. In addition, the length of the strap 68 can be increased form the short length as shown in FIG. 5 in which the shelf is raised to the long length shown in FIG. 6 in which the shelf is lowered. This is effected by a hinge section 72 including two flaps which are connected into the strap by three hinges 73. In the position shown in FIG. 5, the flaps are folded upwardly along side one another. In a position shown in FIG. 6, the flaps are folded outwardly so that the height of the shelf is lowered by the width of the two flap portions.

The hopper generally indicated at 74 includes two downwardly and inwardly inclined side walls 75 and 76 located between the end walls 60 and 61. This inclined side wall 75 and 76 converge inwardly and downwardly to a neck section generally indicated at 77 defined by two generally vertical lower wall portions 78 and 79. The lower wall portions extend vertically downwardly from the lower edge of the inclined wall portion, each to a lower most edge 80, 81 adjacent to but spaced from the shelf in a raised position of the shelf. Each lower wall portion further includes a stiffening groove 82, 83 which is formed by distorting the metal of the wall portion outwardly so as to form a V-shaped projection on the outside and a V-shaped recess on the inside. The groove is spaced downwardly from the lower edge of the inclined wall 75 and 76 and is spaced upwardly from the lower most edge 80, 81. The side walls of the hopper are welded at the ends to the end wall 60 and 61 so as to form a rigid hopper section for containing the feed material which is then discharged inwardly and downwardly toward the neck section 77 for discharge onto the shelf at each side of the shelf.

In order to adjust the position of the lowermost edge of the hopper relative to the trough so as to accommodate movement of the shelf to the lowered position shown in FIG. 6, there is provided an insert member generally indicated at 84. The insert member 84 comprises two supplemental side walls 85 and 86 which are mounted in parallel spaced relation by two or more spacer members 87. The spacer members are arranged at right angles to the supplemental walls and thus span the area therebetween while allowing material to flow between the supplemental walls through the neck of the hopper. The supplemental walls extend from an upper flange portion 88, 89 to lowermost edges 90, 91. The flanges 88 and 89 are inclined upwardly and outwardly so as to match the inclination of the side walls 75 and 76 of the hopper. The spacing of the supplemental walls 85 and 86 is such that these slide as a sliding fit between the lower walls 78 and 79. The height of the supplemental walls from the flange at the upper edge to the lowermost edge 90, 91 is arranged such that, when inserted, the height is sufficient so that the lowermost edges 90 and 91 are spaced downwardly from the lowermost edges 80 and 81 and are arranged relative to the new lower position of the shelf so as to provide the required space between the shelf and the lowermost edges 90, 91.

The insert member is locked in place by a pair of clamping bars 92 and 93. The clamping bars are mounted in horizontal position across the insert member. The clamping bars have ends 94 and 95 each of which projects through a respective hole 96, 97 in the respective supplemental wall. Each of the clamping bars is pivotally mounted on a vertical pivot rod 98, 99 carries on a respective one of the dividers 87. Thus each clamping bar can rotate about the respective pivot rod from a position in which the ends 94 and 95 are retracted from the holes 96, 97 to a position in which the end 94 and 95 are forced outwardly through the holes into engagement with the respective lower wall 78, 79. The clamping bars 92 and 93 are arranged at a height such that with the flanges 88 and 89 sitting on the top of the lower wall, the clamping bars engage into the slots or grooves 82, 83 to rigidly engage with the grooves and thus with the lower wall 78, 79 to hold the insert member in place rigidly against vertical movement and against side to side movement.

Each clamping bar 92, 93 carries a handle 100 which has a vertical portion 101 standing upwardly from the top of the clamping bar and a horizontal portion 102. The horizontal portion 102 can thus be grasped manually for the action of manipulating the insert member into and out of its position in the neck and for rotating the clamping bars about the respective pivot rods 98, 99.

The conversion of the feeder therefore from the lowered initial position for the smaller animal can therefore be readily effected simply by removing the insert member to a storage location and by lifting the straps 68. In this way the shelf is moved upwards from its lowered position to a position just below the lowermost edges 80 and 81 of the lower walls 78 and 79 so that the feeder continues to operate in the well known manner of the shelf feeder but at the raised height for the larger animal.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A feeder for feeding animals while the animals grow from a first smaller size to a second larger size comprising:

a trough having a base and a side wall over which the animals can reach for taking feed from the trough;

a shelf mounted above the base of the trough and arranged at a height such that the animals can take feed from the shelf while reaching over the side wall and such that feed falling from the shelf is collected in the trough;

the shelf being adjustable for raising and lowering the shelf whereby the height of the shelf from the base of the trough can be adjusted to at least two different heights including a first lower height to accommodate said animals at the first smaller size and including a second higher height to accommodate said animals at the second larger size;

a feed hopper positioned above the shelf for depositing feed onto the shelf, the hopper having an inclined hopper wall and a substantially vertical lower wall portion at a bottom of the inclined wall, the lower wall portion having a lowermost edge extending along the shelf and arranged, with the shelf at the higher height, at a distance from the shelf which distance acts to control an amount of feed discharged from the hopper onto the shelf, and which distance together with the relative locations of the shelf and the lowermost edge of the lower wall portion acts to maintain the feed discharged on the shelf unless moved from the shelf by the animal;

and a separate insert member insertable into and removable from the hopper, the insert member having a supplementary wall portion arranged such that, when inserted with the shelf at the lower height, the supplementary wall portion is located along the lower wall portion and projects downwardly therefrom to define a lowermost edge of the supplementary wall portion below the lowermost edge of the lower wall portion and at a distance from the shelf which distance acts to control an amount of feed discharged from the hopper onto the shelf, and which distance together with the relative locations of the shelf and the lowermost edge of the supplementary wall portion acts to maintain the feed discharged on the shelf unless moved from the shelf by the animal.

2. The feeder according to claim 1 wherein there is provided a clamping member operable to locate the insert member in the hopper.

3. The feeder according to claim 2 wherein the clamping member is manually operable.

4. The feeder according to claim 3 wherein the clamping member provides a handle extending upwardly from the insert member within the hopper for manually grasping the insert member for removal from the hopper.

5. The feeder according to claim 2 wherein the clamping member includes a generally horizontal clamp bar rotatable about a substantially vertical axis such that an end of the clamp bar extends through an opening in the supplemental wall portion into engagement with the lower wall portion.

6. The feeder according to claim 5 wherein the lower wall portion includes a generally horizontal groove therein and wherein the end of the clamp bar engages in the groove to hold the insert against vertical movement relative to the lower wall portion.

7. The feeder according to claim 1 wherein the supplemental wall portion includes an inclined flange portion for engaging an edge portion of the inclined wall at the lower wall portion.

8. A feeder for feeding animals while the animals grow from a first smaller size to a second larger size comprising:

a trough having a base, a first longitudinal side wall and a second longitudinal side wall parallel to the first side wall over both of which the animals can reach for taking feed from opposed sides of the trough;

a shelf mounted above the base of the trough and arranged at a height such that the animals can take feed from the shelf while reaching over the side wall and such that feed falling from the shelf is collected in the trough;

the shelf having two side edges each presented toward a respective side of the trough;

the shelf being adjustable for raising and lowering the shelf whereby the height of the shelf from the base of the trough can be adjusted to at least two different heights including a first lower height to accommodate said animals at the first smaller size and including a second higher height to accommodate said animals at the second larger size;

a feed hopper positioned above the shelf for depositing feed onto the shelf, the hopper having two inclined side walls converging inwardly and downwardly to, a neck portion defined by two substantially parallel, vertical lower wall portions, the lower wall portions each having a lowermost edge extending along the shelf and arranged, with the shelf at the higher height, at a distance from the shelf which distance acts to control an amount of feed discharged from the hopper onto the shelf, and which distance together with the relative locations of the shelf and the lowermost edge of the lower wall portion acts to maintain the feed discharged on the shelf unless moved from the shelf by the animal;

and a separate insert member insertable into and removable from the neck portion of the hopper, the insert member having two parallel spaced supplementary wall portions arranged such that, when inserted into the neck portion with the shelf at the lower height, the supplementary wall portions are located along respective ones of the lower wall portions and project downwardly therefrom to define a lowermost edge of each of the supplementary wall portion below the lowermost edge of the respective lower wall portion and at a distance from the shelf which distance acts to control an amount of feed discharged from the hopper onto the shelf, and which distance together with the relative locations of the shelf and the lowermost edge of the supplementary wall portion acts to maintain the feed discharged on the shelf unless moved from the shelf by the animal.

9. The feeder according to claim 8 wherein there is provided a clamping member operable to locate the insert member in the neck portion of the hopper.

10. The feeder according to claim 9 wherein the clamping member is manually operable.

11. The feeder according to claim 10 wherein the clamping member provides a handle extending upwardly from the insert member within the hopper for manually grasping the insert member for removal from the neck portion of the hopper.

12. The feeder according to claim 9 wherein the clamping member includes a generally horizontal clamp bar rotatable about a substantially vertical axis such that each end of the clamp bar extends through an opening in a respective one of the supplemental wall portions into engagement with a respective one of the lower wall portions.

13. The feeder according to claim 12 wherein each lower wall portion includes a generally horizontal groove therein and wherein the end of the clamp bar engages into the groove to hold the insert against vertical movement relative to the lower wall portion.

14. The feeder according to claim 8 wherein the supplementary wall portions are connected at a fixed spacing by spacer members arranged to allow the passage of feed through the neck portion to the shelf.

15. The feeder according to claim 8 wherein each supplemental wall portion includes an inclined flange portion for engaging an edge portion of a respective one of the inclined walls at the respective lower wall portion.

16. The feeder according to claim 8 wherein the supplementary wall portions are connected at a fixed spacing by at least two spacer members arranged to allow the passage of feed through the neck portion to the shelf and wherein there is provided two generally horizontal clamp bars each rotatably mounted on a respective one of the spacer members for rotation about a substantially vertical axis such that each end of the clamp bar extends through an opening in a respective one of the supplemental wall portions into engagement with a respective one of the lower wall portions.

17. The feeder according to claim 16 wherein each clamp bar carries a handle extending upwardly therefrom within the hopper for manually grasping the insert member for removal from the neck portion of the hopper.

18. A feeder for feeding animals while the animals grow from a first smaller size to a second larger size comprising:
a trough having a base and a front wall over which the animals can reach for taking feed from the trough;
the base being generally horizontal so as to allow the feed entering the trough to rest on an upper surface of the base and including a front edge of the base;
a feed hopper positioned above the trough for discharging feed downwardly such that feed entering the trough can be taken from the trough by the animals;
the front wall including an adjustment portion for adjusting a height of the front wall such that an upper edge of the front wall can be located at a first low height for the animals at the first smaller size and can be located at a second raised height for the animals at the second larger size;
the front wall being attached to the base at the front edge and extending in a direction which is inclined upwardly and forwardly from the front edge of the base such that the upper edge of the front wall is spaced forwardly of the front edge of the base;
the front wall including the adjustment portion being shaped such that all of the front wall including the adjustment portion is forward of an imaginary vertical line intersecting the front edge of the base;
wherein the front wall includes a lower portion and wherein the upper edge of the front wall at the first low height is defined by an upper edge of the lower portion and wherein the adjustment portion at the second raised height is connected to the lower portion so as to extend upwardly and forwardly from the upper edge of the lower portion such that, at the second raised height, the upper edge is defined by an upper edge of the adjustment portion;
wherein the adjustment portion is separate from the lower portion and is removed from the lower portion at the first height
and wherein the adjustment portion includes a channel at a lower edge of the adjustment portion for receiving the upper edge of the lower portion therein.

19. A method of feeding animals while the animals grow from a first smaller size to a second larger size comprising:
providing a trough having a base and a front wall over which the animals can reach for taking feed from the trough;
the base being generally horizontal so as to allow the feed entering the trough to rest on an upper surface of the base and including a front edge of the base;
providing a feed hopper positioned above the trough for discharging feed downwardly such that feed entering the trough can be taken from the trough by the animals;
providing on the front wall a lower portion having an upper edge defining a first low height for the animals at the smaller size;
providing on the front wall an adjustment portion having an upper edge for adjusting a height of the front wall to a second raised height for the animals at the second larger size;
with the animals at the first small size, moving the adjustment portion such that the upper edge of the front wall at the first low height is defined by the upper edge of the lower portion so as to cause the animals at the first small size to reach over the upper edge of the lower portion for eating the feed to grow and, when the animals have grown to a predetermined size, moving the adjustment portion such that the adjustment portion extends upwardly and forwardly from the upper edge of the lower portion and such that, at the second raised height, the upper edge is defined by an upper edge of the adjustment portion, so as to cause the animals at the second larger size to reach over the upper edge of the adjustment portion for eating the feed to grow;
wherein the adjustment portion is separate from the lower portion and is removed from the lower portion at the first height;
and wherein the adjustment portion includes a channel at a lower edge of the adjustment portion for receiving the upper edge of the lower portion therein.

20. A feeder for feeding animals while the animals grow from a first smaller size to a second larger size comprising:
a trough having a base and a front wall over which the animals can reach for taking feed from the trough;
the base being generally horizontal so as to allow the feed entering the trough to rest on an upper surface of the base and including a front edge of the base;
a feed hopper positioned above the trough for discharging feed downwardly such that feed entering the trough can be taken from the trough by the animals;
the front wall being attached to the base at the front edge and extending in a direction which is inclined upwardly and forwardly from the front edge of the base such that the upper edge of the front wall is spaced forwardly of the front edge of the base;
the front wall including an adjustment portion for adjusting a height of the front wall such that an upper edge of the front wall can be located at a first low height for the animals at the first smaller size and can be located at a second raised height for the animals at the second larger size;
the front wall including the adjustment portion being shaped such that all of the front wall including the adjustment portion is forward of an imaginary vertical line intersecting the front edge of the base;
and the front wall including the adjustment portion being shaped such that the position of the upper edge of the front wall at the raised height is spaced forwardly of the position of the upper edge of the front wall at the first low height;

and a shelf mounted above the base of the trough and arranged at a height such that the animals can take feed from the shelf while reaching over the side wall and such that feed falling from the shelf is collected in the trough;

the shelf being adjustable for raising and lowering the shelf whereby the height of the shelf from the base of the trough can be adjusted to at least two different heights including a first lower height to accommodate said animals at the first smaller size and including a second higher height to accommodate said animals at the second larger size;

the feed hopper being positioned above the shelf for depositing feed onto the shelf, the hopper having a lowermost edge extending along the shelf and arranged, with the shelf at the higher height, at a distance from the shelf which distance acts to control an amount of feed discharged from the hopper onto the shelf, and which distance together with the relative locations of the shelf and the lowermost edge of the acts to maintain the feed discharged on the shelf unless moved from the shelf by the animal.

* * * * *